Patented Dec. 4, 1945

2,390,363

UNITED STATES PATENT OFFICE 2,390,363

PRODUCTION OF ACENAPHTHYLENE

Ralph G. Flowers, Pittsfield, Mass., assignor to General Electric Company, a corporation of New York No Drawing. Application December 11, 1944, Serial No. 567,785

3 Claims. (Cl. 260—668)

The present invention relates to an improved method for the production of acenaphthylene.

Acenaphthylene has heretofore been prepared by passing acenaphthene vapors through a heated tube containing various dehydrogenation catalysts. Such a process requires the use of elaborate equipment, and as far as I am aware has not been used commercially due in part to the equipment required for this type of reaction, and also because of catalyst deterioration.

The method of the present invention is simple and economical as compared with the dehydrogenation methods previously used in preparing acenaphthylene and involves a wet method rather than the dry or vapor process. Briefly, my method comprises the reaction of acenaphthene in glacial acetic acid in the presence of $Pb_3O_4$ to produce 1-acetoxy-acenaphthene which is subsequently converted to acenaphthylene by deacetylation.

In order that those skilled in the art may better understand the invention, the following is a specific example illustrative of the method of the preparation of acenaphthylene in accordance with the present invention.

231 grams of acenaphthene are added with constant stirring to 1650 ml. of glacial acetic acid in a 3-necked, 3-liter flask and heated to 60–70° C. Solution of the materials is complete by the time the temperature range is reached. The flask is cooled externally and 1230 grams of $Pb_3O_4$ are added in portions of 50 grams. This step takes about two hours as each portion is added after the red color disappears. The vessel is stirred for one hour after the addition of the $Pb_3O_4$. The reaction mixture is poured into three liters of water and mixed and extracted twice with ethyl ether first with 525 ml. and then with 375 ml. of the solvent. The ethereal solution is washed with 100 ml. of water followed by three successive washings with saturated NaCl solution. The ethereal solution is then dried with 25 grams of anhydrous $Na_2SO_4$ and filtered. The ether is distilled off at atmospheric pressure and the crude product is then distilled at 1 mm. pressure at 140–146° C. The distillate, 1-acetoxyacenaphthene, is a yellow liquid.

208 grams of the distillate are passed at the rate of one drop per second into an inclined quartz tube (1″ diameter x 24″ heated by winding with nichrome wire) which is maintained at 520° C. $CO_2$ gas is passed through the combustion tube at the rate of one bubble per second to reduce sidereactions during the course of the main reaction.

The vapors are condensed in a suction flask cooled with dry ice. This solid material is then pulverized and washed with water to remove the acetic acid formed during the deacetylation. The crude acenaphthylene is then distilled at 3 mm. pressure from 103–106° C. using a small amount of quinol as a polymerization inhibitor. The distillate is recrystallized from ethyl alcohol as large yellow plates. The yield is 72% of the starting acenaphthene.

The process of the present invention is especially useful in preparing acenaphthylene of high degree of purity for use in the manufacture of high molecular weight polymers of acenaphthylene and various copolymers of acenaphthylene. Such polymers and copolymers are more fully described and claimed in the copending application of Miller and Flowers Serial No. 555,895, filed September 26, 1944, and assigned to the assignee of the present invention.

What I claim as new and desire to secure by Letters Patent of the United States is:

1. The process of producing acenaphthylene which comprises reacting under heat acenaphthene and glacial acetic acid in the presence of $Pb_3O_4$ and subjecting the product of reaction to deacetylation.

2. The process of producing acenaphthylene which comprises reacting at a temperature of 60–70° C. acenaphthene and glacial acetic acid in the presence of $Pb_3O_4$ to produce 1-acetoxyacenaphthene and converting the latter to acenaphthylene by deacetylation at elevated temperature.

3. The process of producing acenaphthylene of high degree of purity which comprises reacting acenaphthene and glacial acetic acid in the presence of $Pb_3O_4$ at a temperature of 60–70° C., subjecting the product of reaction to deacetylation at elevated temperature in the presence of an inert gas, and distilling the crude acenaphthylene at reduced pressure.

RALPH G. FLOWERS.